United States Patent
Tanaka (10) Patent No.: US 11,226,780 B2
(45) Date of Patent: Jan. 18, 2022

(54) INFORMATION PROCESSING APPARATUS AND CONTROL METHOD OF INFORMATION PROCESSING APPARATUS

(71) Applicant: SEIKO EPSON CORPORATION, Tokyo (JP)

(72) Inventor: Dai Tanaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/555,861

(22) Filed: Aug. 29, 2019

(65) Prior Publication Data

US 2020/0073605 A1 Mar. 5, 2020

(30) Foreign Application Priority Data

Aug. 30, 2018 (JP) .............................. JP2018-162175

(51) Int. Cl.
*G06F 3/12* (2006.01)

(52) U.S. Cl.
CPC .......... *G06F 3/1238* (2013.01); *G06F 3/1231* (2013.01); *G06F 3/1293* (2013.01)

(58) Field of Classification Search
CPC .... G06F 3/1263; G06F 3/1206; G06F 3/1259; G06F 3/1282; G06F 3/1209; G06F 3/1231; G06F 3/1236; G06F 3/1293; G06F 3/1225; G06F 9/4411; H04L 61/2038; H04L 61/20; H04L 12/28; H04L 12/4625; G06Q 10/087
See application file for complete search history.

(56) References Cited

U.S. PATENT DOCUMENTS

| 2002/0156947 A1* | 10/2002 | Nishio | G06F 9/4411 |
| | | | 710/36 |
| 2007/0095906 A1* | 5/2007 | Camilleri | G06Q 10/087 |
| | | | 235/385 |
| 2018/0227445 A1* | 8/2018 | Minegishi | G06F 3/1225 |
| 2019/0361633 A1* | 11/2019 | Wang | G06F 3/1222 |

FOREIGN PATENT DOCUMENTS

JP 2013-109466 6/2013

* cited by examiner

*Primary Examiner* — Iriana Cruz
(74) *Attorney, Agent, or Firm* — Workman Nydegger (57) ABSTRACT

An information processing apparatus includes: a CPU board configured to communicate with an external apparatus via a network and including a CPU; and a printer being an internal equipment configured to communicate with the CPU board by a communication method different from a communication method used between the CPU board and the network and having a USB device descriptor, wherein the CPU obtains the USB device descriptor from the printer and generates identification information corresponding to the printer based on the obtained USB device descriptor, and when the CPU receives an inquiry request to the printer from the external apparatus, the CPU transmits first response information indicating the generated identification information to the external apparatus.

12 Claims, 8 Drawing Sheets

INFORMATION PROCESSING APPARATUS AND CONTROL METHOD OF INFORMATION PROCESSING APPARATUS

The present application is based on, and claims priority from JP Application Serial Number 2018-162175, filed Aug. 30, 2018, the disclosure of which is hereby incorporated by reference herein in its entirety.

BACKGROUND

1. Technical Field

The present disclosure relates to an information processing apparatus capable of connecting to an external apparatus via a network and a control method of an information processing apparatus.

2. Related Art

JP-A-2013-109466 discloses a device server that is connected to USB (Universal Serial Bus) equipment not having a serial number and that is also connected to a PC via a network.

The related-art technique in JP-A-2013-109466 fails to disclose an information processing apparatus that includes internal equipment, such as USB equipment, or the like and control equipment and that does not use a device server.

It is not possible for the related-art technique to simply control, from an external apparatus via a network, internal equipment that is included in an information processing apparatus but that does not support a network connection.

SUMMARY

According to an aspect of the present disclosure, there is provided an information processing apparatus including: control equipment configured to communicate with an external apparatus by a first communication method via a network and include a controller; and internal equipment configured to communicate with the control equipment by a second communication method different from the first communication method and having equipment information, wherein the controller obtains the equipment information from the internal equipment and generates identification information corresponding to the internal equipment based on the obtained equipment information, and when the controller receives an inquiry request to the internal equipment from the external apparatus via the network, the controller transmits first response information indicating the generated identification information to the external apparatus.

According to another aspect of the present disclosure, there is provided a method of controlling an information processing apparatus including control equipment including a controller and configured to communicate with an external apparatus by a first communication method via a network and internal equipment configured to communicate with the control equipment by a second communication method different from the first communication method and having equipment information, the method including: obtaining the equipment information from the internal equipment and generating identification information corresponding to the internal equipment based on the obtained equipment information, and when receiving an inquiry request to the internal equipment from the external apparatus via the network, transmitting first response information indicating the generated identification information to an external apparatus.

DESCRIPTION OF EXEMPLARY EMBODIMENTS

Figure 1:
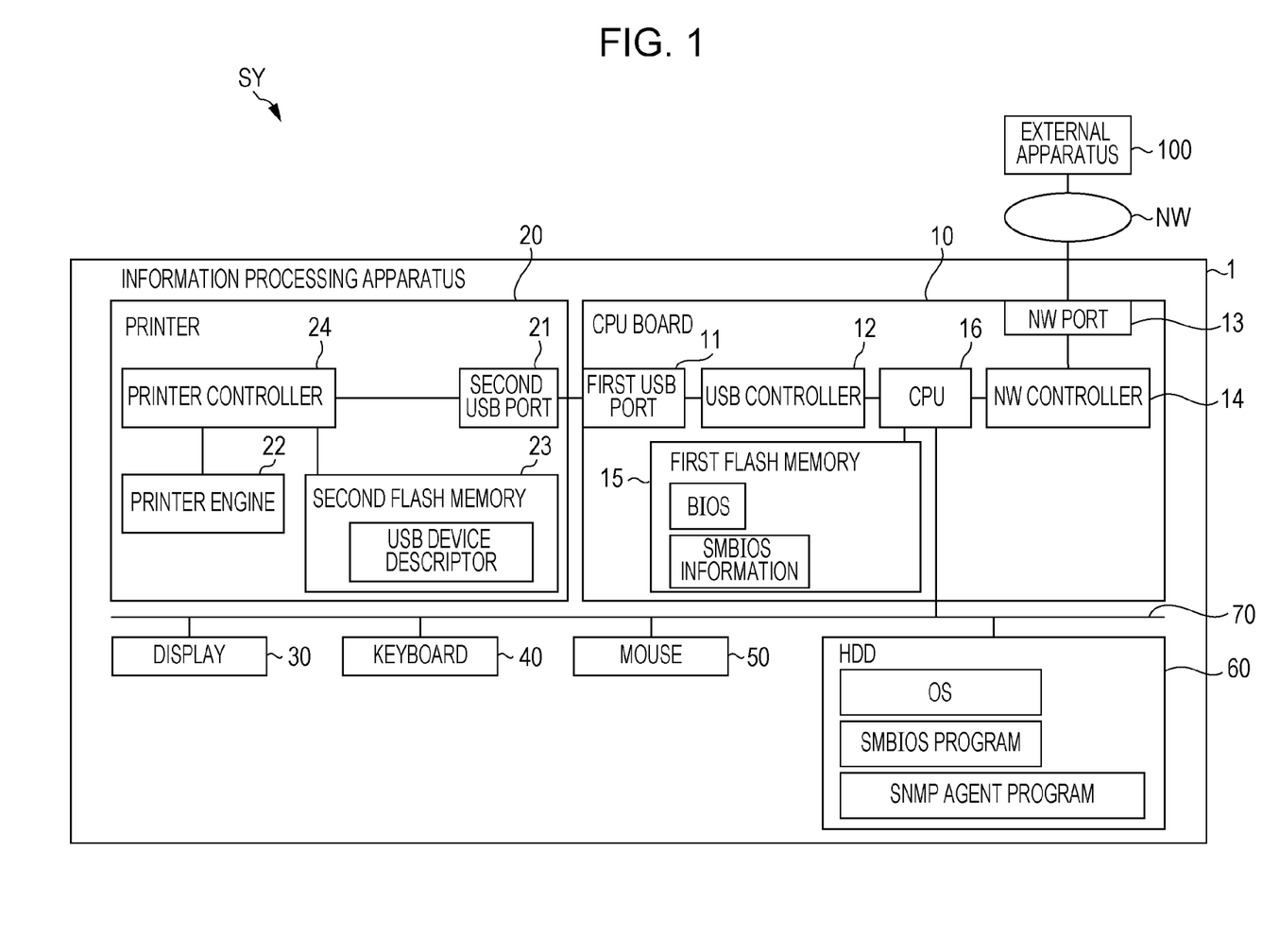
FIG. 1 is a block diagram of a network system.

In the following, a description will be given of an information processing apparatus according to an embodiment and a control method of an information processing apparatus with reference to the accompanying drawings. FIG. 1 is a block diagram of a network system SY. The network system SY includes an information processing apparatus 1 and an external apparatus 100 connected to the information processing apparatus 1 via a network NW.

Applications for the information processing apparatus 1 are not particularly limited. However, the information processing apparatus 1 functions, for example, as a POS (Point of Sale) system terminal that performs accounting processing or an image forming apparatus that forms an image on a print medium. The external apparatus 100 functions, for example, as a POS server that manages a POS terminal. In this case, the external apparatus 100 generates receipt print data and coupon print data based on accounting information obtained from the information processing apparatus 1 and performs processing, such as transmitting the generated print data to the information processing apparatus 1, and the like.

The network NW is, for example, the Internet. The external apparatus 100 is, for example, a web server apparatus, a PC (personal computer), or a tablet terminal.

The information processing apparatus 1 includes a CPU (central processing unit) board 10, a printer 20, a display 30, a keyboard 40, a mouse 50, and an HDD (hard disk drive) 60. The CPU board 10 is an example of the "control equipment", the printer 20 is an example of the "internal equipment" and the "USB equipment", and the HDD 60 is an example of the "second memory". In this regard, the components other than the printer 20 in the information processing apparatus 1, that is to say, the CPU board 10, the display 30, the keyboard 40, the mouse 50, and the HDD 60 represent, for example, a PC.

The printer 20 is, for example, a receipt printer that prints receipts and coupons. Also, it is assumed that the printer 20 does not support network communication. The network system SY according to the present embodiment has a configuration in which the CPU board 10 is disposed between the printer 20 and the external apparatus 100 to control the printer 20 from the external apparatus 100.

The CPU board 10 includes a first USB port 11, a USB controller 12, a network port 13, a network controller 14, a first flash memory 15, and a CPU 16 (processor). The first flash memory 15 is an example of a "first memory" and the CPU 16 is an example of the "controller". In this regard, in FIG. 1, the network port 13 is denoted as a "NW port" and the network controller 14 is denoted as a "NW controller".

The first USB port 11 is a port used by the CPU board 10 to perform USB communication with the printer 20. The first USB port 11 is coupled to a second USB port 21 of the printer 20. That is to say, the communication method used between the CPU board 10 and the printer 20 conforms to the USB communication standard. The USB controller 12 controls USB communication based on instructions from the CPU 16.

The network port 13 is a port used by the CPU 16 to perform network communication with the external apparatus 100. The network port 13 is connected to a network port of the external apparatus 100. In this regard, communication between the CPU board 10 and the external apparatus 100 is performed using SNMP (Simple Network Management Protocol). SNMP is an example of a "predetermined communication protocol". The network controller 14 controls network communication based on the instructions from the CPU 16. The network controller 14 is mounted on the CPU board 10, for example, as a network card.

The first flash memory 15 stores BIOS (Basic Input/Output System) and SMBIOS (System Management BIOS) information. The BIOS is a program that is executed when the CPU board 10 is started. The CPU 16 reads the BIOS from the first flash memory 15 and executes the BIOS, initializes various kinds of hardware coupled to the CPU board 10, reads the OS (Operating System) from the HDD 60, starts the OS, and the like.

The SMBIOS information includes various kinds of information defined by the SMBIOS, such as BIOS information, system information, and a UUID (Universally Unique Identifier), and the like. For example, the BIOS information includes a BIOS setting value. Also, the system information includes identification information corresponding to the printer 20. The identification information is generated by using a USB device descriptor obtained from the printer 20. The details thereof will be described later.

The CPU 16 is coupled to a display 30, a keyboard 40, a mouse 50, and an HDD 60 via a bus 70 and controls the hardware thereof. The CPU 16 also controls various kinds of processing, such as the BIOS processing executed by starting of the BIOS, the communication processing between the printer 20 and the external apparatus 100, and the like in combination with the hardware described above.

The printer 20 includes a second USB port 21, a printer engine 22, a second flash memory 23, and a printer controller 24 including a CPU (processor). The second USB port 21 is a port used by the printer 20 to perform USB communication with the CPU board 10. The printer engine 22 includes a print head, a paper transport mechanism, and a printing mechanism, such as a paper cutting mechanism (cutter), and the like and performs printing (image formation) on a print medium, such as receipt paper, or the like under the control of the printer controller 24.

The second flash memory 23 stores firmware that controls the printer engine 22 and the USB device descriptor. The USB device descriptor is an example of the "equipment information". A USB device descriptor includes "iManufacturer" (indicates a manufacturer name) regarding the printer 20, "iProduct" (indicates a product name thereof), "iSerial Number" (indicates a serial number thereof), and the like.

The CPU of the printer controller 24 reads the firmware from the second flash memory 23 and executes the firmware to cause the printer engine 22 to perform printing in accordance with a print instruction from the CPU board 10. Also, the printer controller 24 reads the USB device descriptor stored in the second flash memory 23 and transmits the USB device descriptor to the CPU board 10 in accordance with an information request from the CPU board 10.

The display 30 displays various kinds of information, such as a BIOS menu M (refer to FIG. 2) and the like. The keyboard 40 and the mouse 50 are used by a user for various operations, such as operation of the BIOS menu M and the like.

The HDD 60 stores the OS, the SMBIOS program, and the SNMP agent program. The SMBIOS program and the SNMP agent program are examples of the communication programs for realizing communication based on the "predetermined communication protocol".

The OS is fundamental software executed by the CPU 16. The SMBIOS program is used by the CPU 16 to read or write the SMBIOS information. Also, the SNMP agent program is used by the CPU 16 to perform network communication based on SNMP. In this regard, although not illustrated in the figures in particular, a SNMP manager program corresponding to the SNMP agent program is stored in the external apparatus 100. The external apparatus 100 is caused to function as an SNMP manager by the SNMP manager program and manages the information processing apparatus 1, which becomes an SNMP agent.

With the configuration described above, the CPU 16 on the CPU board 10 requests a USB device descriptor from the printer 20 in auto-fill processing (refer to FIG. 5 and FIG. 6), which is executed as part of the BIOS processing. The CPU 16 stores the USB device descriptor returned from the printer 20 in a predetermined storage area of the first flash memory 15. The CPU 16 generates identification information corresponding to the printer 20 from the USB device descriptor stored in the first flash memory 15 by using the SMBIOS program and stores the identification information as part of the SMBIOS information.

Figure 7:
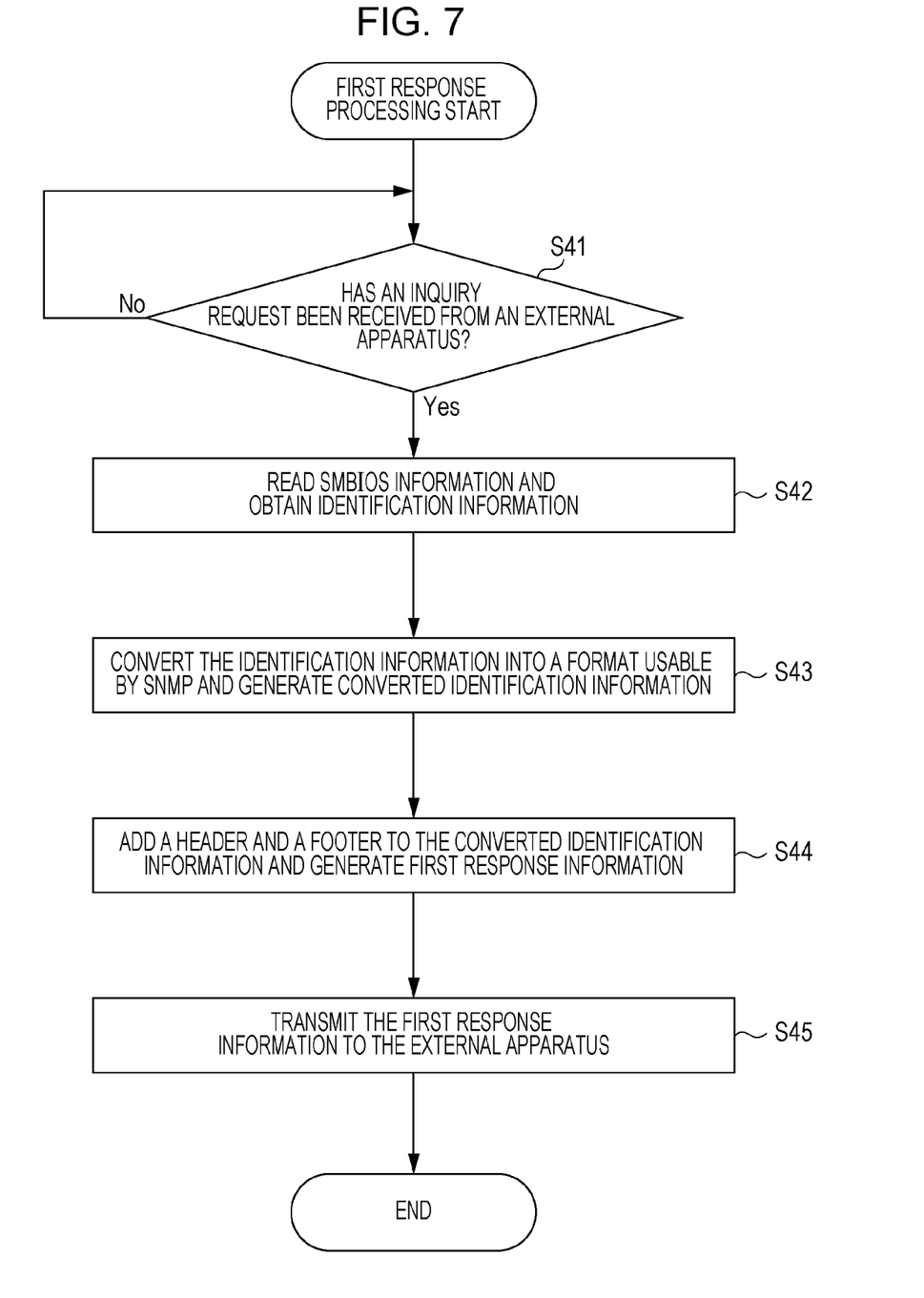
FIG. 7 is a flowchart illustrating first response processing.

Also, when the CPU 16 receives an inquiry request for the printer 20 from the external apparatus 100, the CPU 16 transmits to the external apparatus 100 first response information indicating the identification information stored as part of the SMBIOS information (refer to FIG. 7). The identification information is information necessary for the external apparatus 100 to control the printer 20 via the CPU board 10. Also, when the CPU 16 receives a communication request for the printer 20 from the external apparatus 100, the CPU 16 transmits to the external apparatus 100 second response information indicating the identification information stored as part of the SMBIOS information (refer to FIG. 8).

Also, when the CPU 16 receives print data in XML (Extensible Markup Language) format from the external apparatus 100, the CPU 16 analyzes the print data in XML format and converts the print data into character codes, which correspond to print instructions executable by the firmware of the printer 20, image data, and commands. The CPU 16 transmits the converted print instructions to the printer 20 to form an image.

Figure 2:
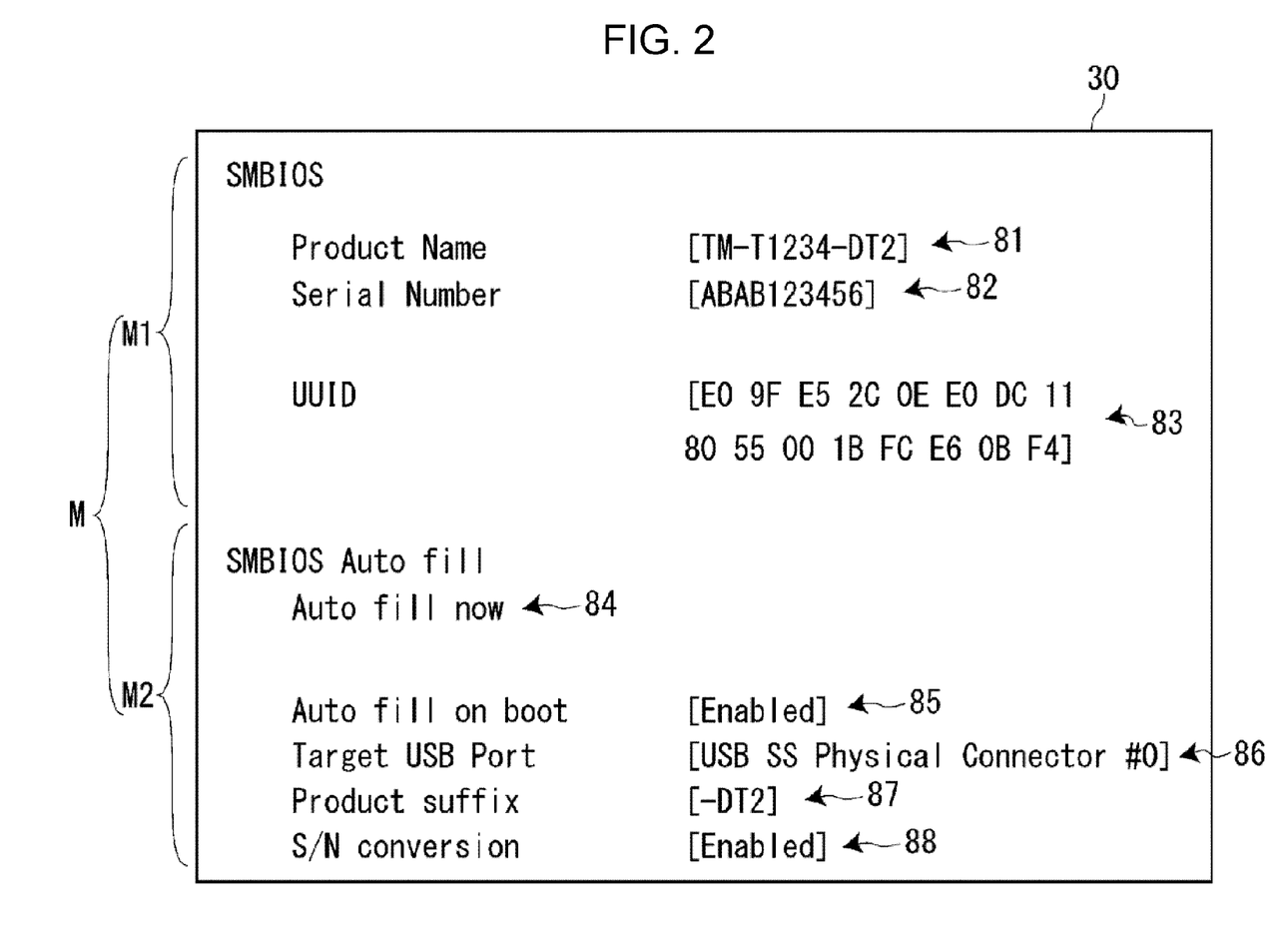
FIG. 2 is a diagram illustrating an example of a BIOS menu.

FIG. 2 is a diagram illustrating an example of a BIOS menu M. The BIOS menu M is displayed on the display 30 in accordance with a user operation. The BIOS menu M includes an SMBIOS menu M1 and an SMBIOS Auto-fill menu M2.

The SMBIOS menu M1 includes information 81 on the product name, information 82 on the serial number, and information 83 on the UUID. Here, the information 81 on the product name and the information 82 on the serial number correspond to the identification information corresponding to the printer 20. Also, the information 83 on the UUID is information generated using a MAC (Media Access Control) address of the network controller 14.

The SMBIOS Auto fill menu M2 includes an Auto fill now button 84, information 85 on auto fill on boot, information 86 on a target USB port, information 87 on a product suffix, and information 88 on an S/N conversion.

The Auto fill now button 84 is a button to be selected when the user manually performs the auto-fill processing. When the Auto fill now button 84 is selected, the SMBIOS information is updated, and the information processing apparatus 1 is restarted.

For the information 85 on the auto fill on boot, either "Enabled" or "Disabled" is selected. When "Enabled" is selected, if a predetermined condition is satisfied, the auto-fill processing is performed. In contrast, when "Disabled" is selected, even if the predetermined condition is met, the auto-fill processing is not performed. The predetermined condition is the condition in which the processing proceeds to No in S02 and to Yes in S03 in FIG. 3 described below.

The information 86 on the target USB port is a port name of the first USB port 11. The information 87 on the product suffix is a suffix at the time of generating information 81 on the product name, which becomes part of the identification information. For example, when "iProduct" of the USB device descriptor obtained from the printer 20 is "TM-T1234", and the information 87 on the product suffix is "-DT2", the CPU 16 generates "TM-T1234-DT2", which is produced by concatenating the information 87 on the product suffix to "iProduct" as the information 81 on the product name.

For the information 88 on the S/N conversion, either "Enabled" or "Disabled" is selected. When "Enabled" is selected, the CPU 16 performs serial number conversion processing on the "iSerial number" of the USB device descriptor obtained from the printer 20 and generates information 82 on the serial number, which becomes part of the identification information. The example in FIG. 2 illustrates the case in which serial number conversion processing has been performed. In the serial number conversion processing, the "iSerial Number" of the USB device descriptor is converted into the information 82 of the serial number in accordance with a predetermined conversion rule. In contrast, when "Disabled" is selected as the information 88 on the S/N conversion, the CPU 16 keeps the "iSerial Number" as the information 82 of the serial number without performing the serial number conversion processing on the "iSerial Number" of the USB device descriptor.

Figure 3:
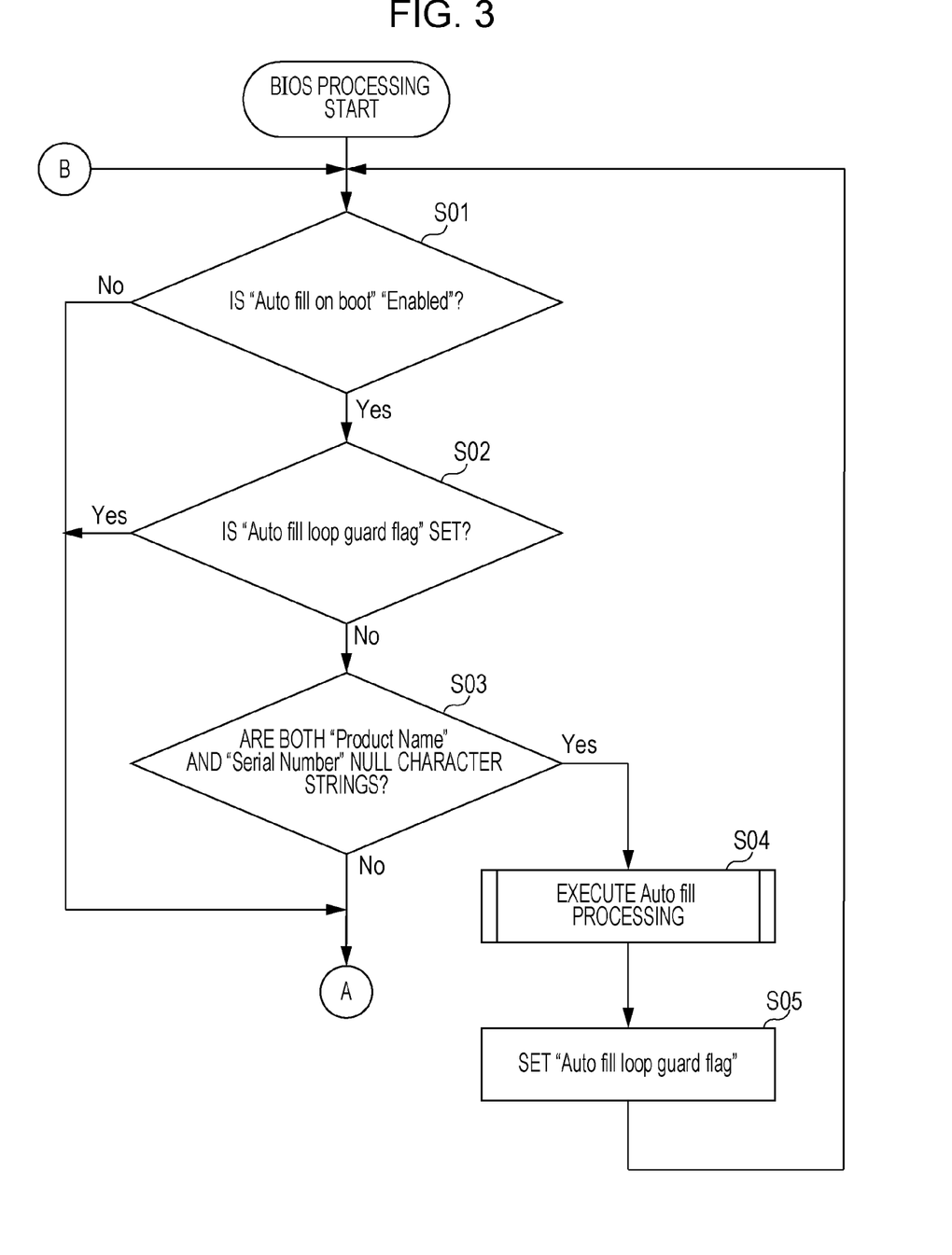
FIG. 3 is a flowchart illustrating BIOS processing.
Figure 4:
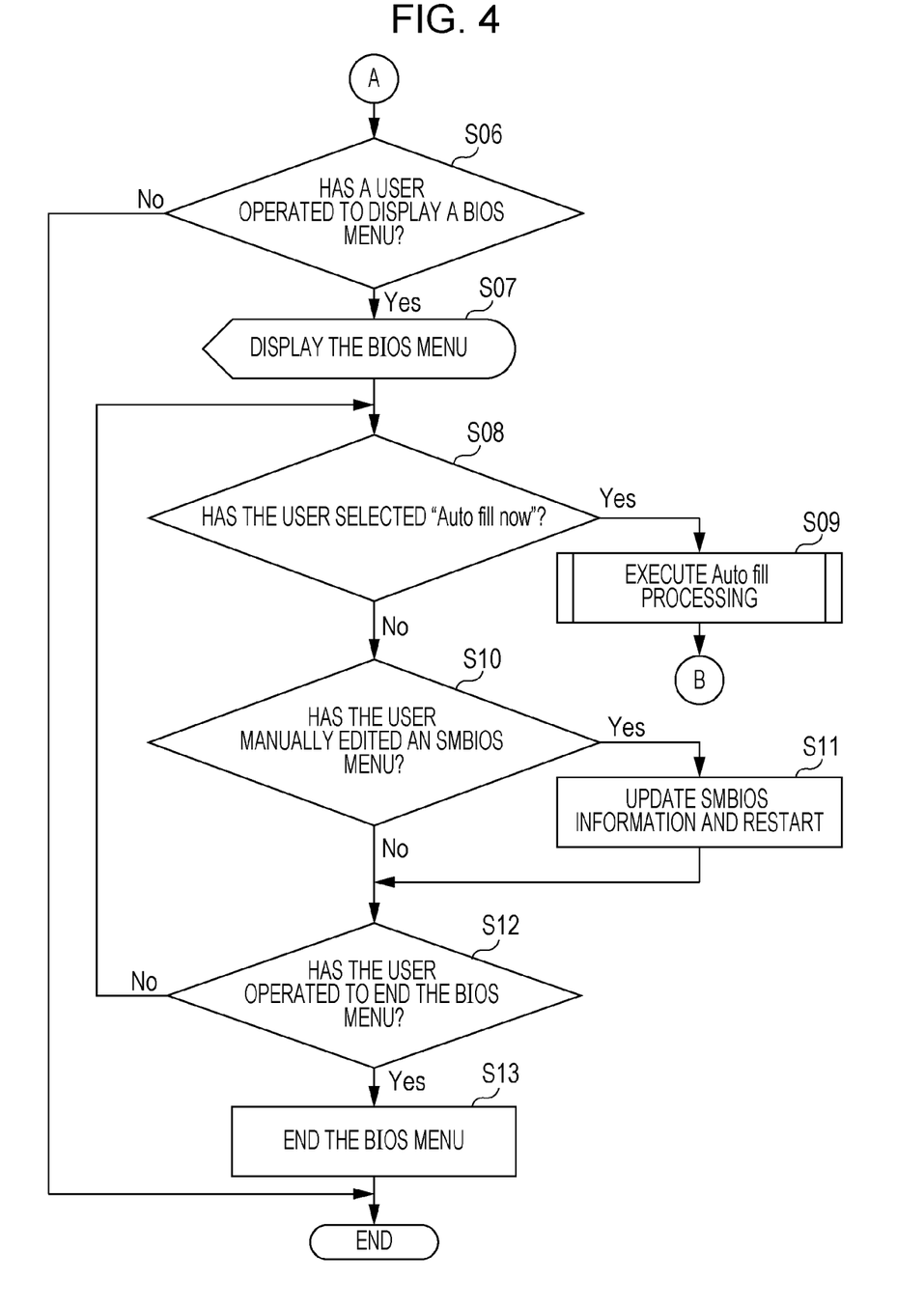
FIG. 4 is a flowchart subsequent to the flowchart in FIG. 3.

FIG. 3 and FIG. 4 are flowcharts illustrating the BIOS processing. The BIOS processing is the processing performed by the CPU 16 based on the BIOS stored in the first flash memory 15. When the BIOS is started, the CPU 16 determines whether or not the information 85 on the auto fill on boot is "Enabled" (S01). When the CPU 16 determines that the information 85 on the auto fill on boot is not "Enabled" (S01: No), the processing proceeds to S06.

When the CPU 16 determines that the information 85 on the auto fill on boot is "Enabled" (S01: Yes), the CPU 16 determines whether or not "Auto fill loop guard flag" is set (S02). The "Auto fill loop guard flag" is an identification flag for the CPU 16 to prevent an infinite loop from occurring when the information 81 on the product name and the information 82 on the serial number are null character strings (empty strings) even if the auto-fill processing is performed, that is to say, when these pieces of information are not input.

When the CPU 16 determines that the "Auto fill loop guard flag" is set (S02: Yes), the processing proceeds to S06, whereas when the CPU 16 determines that the "Auto fill loop guard flag" is not set (S02: No), the CPU 16 determines whether or not both the information 81 on the product name and the information 82 on the serial number are null character strings (S03). When the CPU 16 determines that both the information 81 on the product name and the information 82 on the serial number are not null character strings (S03: No), that is to say, when the CPU 16 determines that at least one of the information 81 on the product name and the information 82 on the serial number has been input, the processing proceeds to S06.

When the CPU 16 determines that both the information 81 on the product name and the information 82 on the serial number are null character strings (S03: Yes), the CPU 16 performs the auto-fill processing (refer to FIG. 5 and FIG. 6) (S04). Then, the CPU 16 sets the "Auto fill loop guard flag" (S05), and the processing returns to S01.

As illustrated in FIG. 4, the CPU 16 determines whether or not the user has performed an operation to display the BIOS menu M (refer to FIG. 2) (S06). When the CPU 16 determines that the user has not performed an operation to display the BIOS menu M (S06: No), the CPU 16 ends the BIOS processing. In contrast, when the CPU 16 determines that the user has performed an operation to display the BIOS menu M (S06: Yes), the CPU 16 displays the BIOS menu M (S07).

The CPU 16 determines whether or not the user has selected the Auto fill now button 84 in the BIOS menu M (S08). When the CPU 16 determines that the user has selected the Auto fill now button 84 (S08: Yes), the CPU 16 performs the auto-fill processing (S09), and the processing returns to S01. In contrast, when the CPU 16 determines that the user has not selected the Auto fill now button 84 (S08: No), the CPU 16 determines whether or not the user has manually edited the SMBIOS menu M1 (S10). When the CPU 16 determines that the user has manually edited the SMBIOS menu M1 (S10: Yes), the CPU 16 updates the SMBIOS information and restarts the information processing apparatus 1 (S11), and the processing proceeds to S12.

The CPU 16 determines whether or not the user has performed an operation to close the BIOS menu M (S12). When CPU 16 determines that the user has not performed an operation to close the BIOS menu M (S12: No), the processing returns to S08. In contrast, when the CPU 16 determines that the user has performed an operation to close the BIOS menu M (S12: Yes), the CPU 16 closes the BIOS menu M (S13) and ends the BIOS processing. In this regard, after the BIOS processing is completed, the CPU 16 starts the OS.

Figure 5:
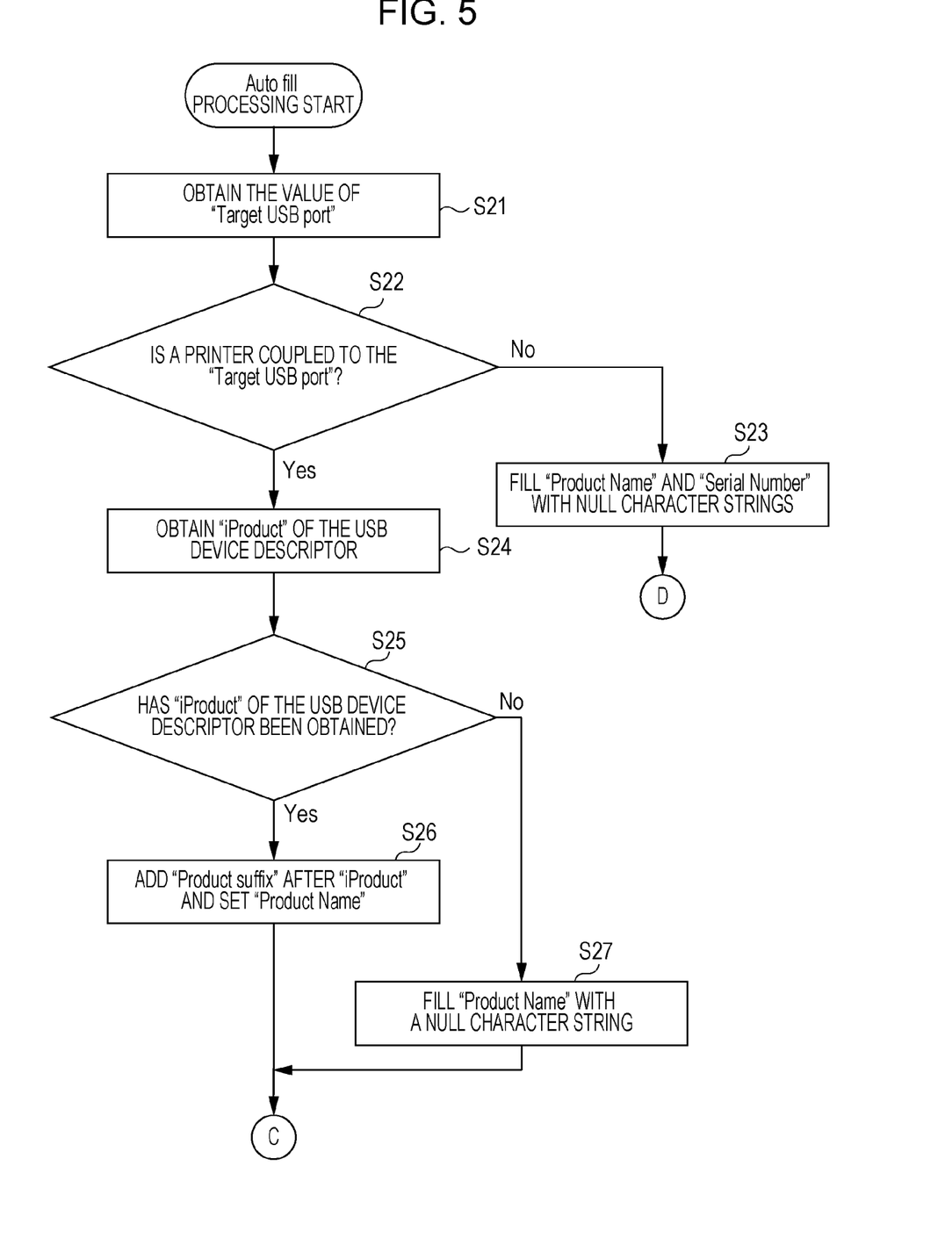
FIG. 5 is a flowchart illustrating auto-fill processing.
Figure 6:
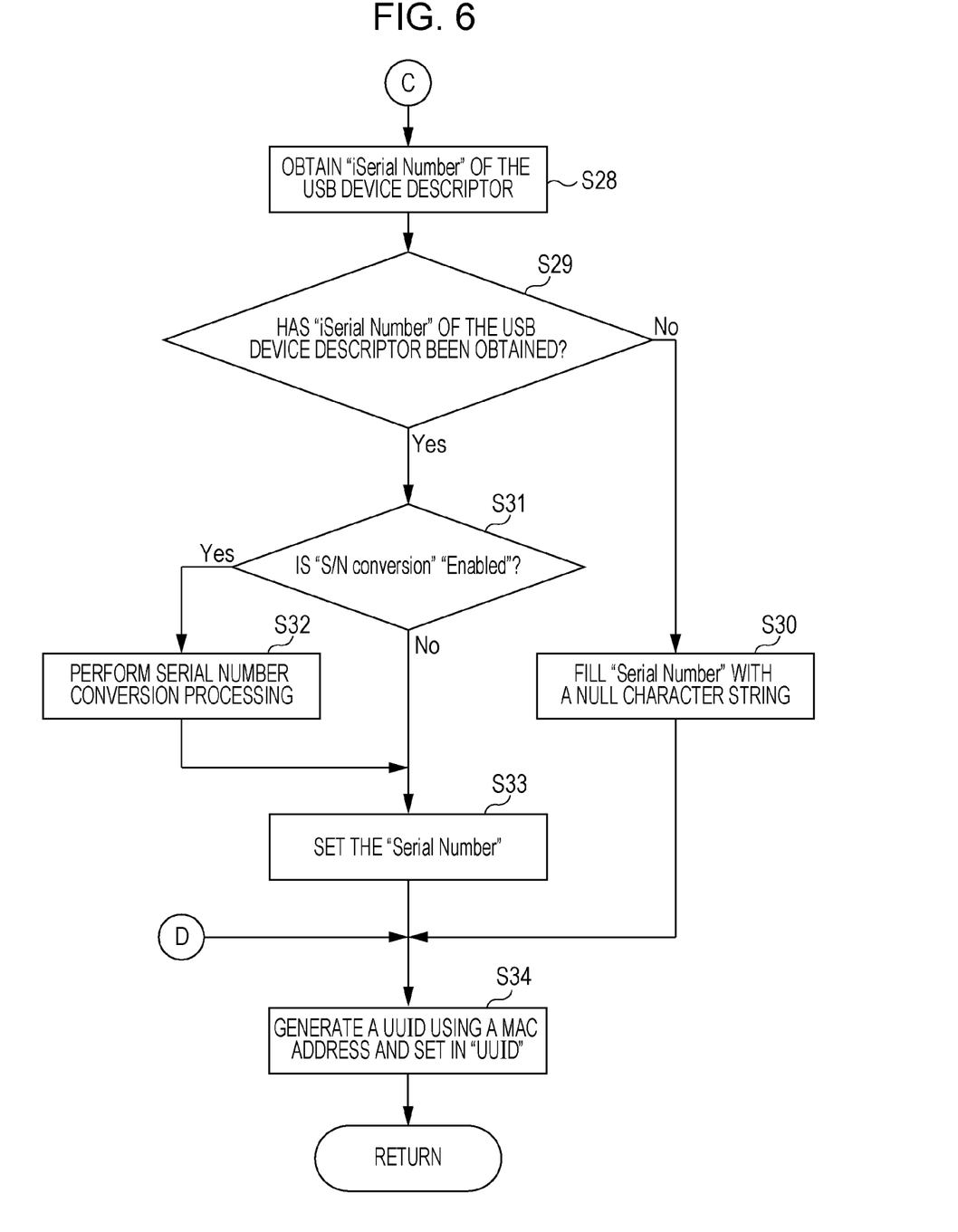
FIG. 6 is a flowchart subsequent to the flowchart in FIG. 5.

FIG. 5 and FIG. 6 are flowcharts illustrating the auto-fill processing. The auto-fill processing is illustrated by a sub-flowchart corresponding to S04 in FIG. 3 and S09 in FIG. 4. When the CPU 16 starts the auto-fill processing, the CPU 16 obtains the value of the target USB port (S21) and determines whether or not the printer 20 is coupled to the target USB port, that is to say, the first USB port 11 (S22).

When the CPU 16 determines that the printer 20 is not coupled to the target USB port (S22: No), the CPU 16 fills the information 81 of the product name and the information 82 of the serial number with null character strings (S23), and the processing proceeds to S34. In contrast, when the CPU 16 determines that the printer 20 is coupled to the target USB port (S22: Yes), the CPU 16 obtains the "iProduct" of the USB device descriptor (S24).

The CPU 16 determines whether or not the CPU 16 has obtained the "iProduct" of the USB device descriptor (S25). When the CPU 16 determines that the CPU 16 has obtained the USB device descriptor (S25: Yes), the CPU 16 concatenates the information 87 of the product suffix to the "iProduct" and sets the information 81 of the product name (S26). Here, "sets the information 81 of the product name" means inputting the information 81 of the product name to the data structure of the SMBIOS and storing the information as the SMBIOS information. In contrast, when the CPU 16 determines that the CPU has failed to obtain the "iProduct" of the USB device descriptor (S25: No), the CPU 16 fills information 87 of the product suffix with a null character string (S27). In this regard, the case in which the CPU 16 fails to obtain the "iProduct" of the USB device descriptor is considered to be a case in which the printer 20 is broken or a case in which the "iProduct" is not stored in the printer 20, or the like.

As illustrated in FIG. 6, after S26 or S27, the CPU 16 obtains the "iSerial Number" of the USB device descriptor (S28). The CPU 16 determines whether or not the CPU 16 has obtained the "iSerial Number" of the USB device descriptor (S29). When the CPU 16 has failed to obtain the "iSerial Number" of the USB device descriptor (S29: No), the CPU 16 fills the information 82 of the serial number with a null character string (S30), and the processing proceeds to S34. The case in which the CPU 16 fails to obtain the "iSerial Number" of the USB device descriptor is considered to be the case in which the printer 20 is broken or the case in which the "iSerial Number" is not stored in the printer 20. In contrast, when the CPU 16 determines the CPU 16 has obtained the "iSerial Number" of the USB device descriptor (S29: Yes), the CPU 16 determines whether or not the information 88 on the S/N conversion is "Enabled" (S31).

When the CPU 16 determines that the information 88 on the S/N conversion is "Enabled" (S31: Yes), the CPU 16 performs the serial number conversion processing on the "iSerial Number" of the USB device descriptor obtained from the printer 20 (S32) and sets the information 82 on the serial number (S33). That is to say, the CPU 16 stores the information obtained by performing the serial number conversion processing on the "iSerial Number" as part of the SMBIOS information. In contrast, when the CPU 16 determines that the information 88 on the S/N conversion is not "Enabled" (S31: No), the CPU 16 sets the information 82 on the serial number without performing the serial number conversion processing on the "iSerial Number" (S33). That is to say, the CPU 16 stores the "iSerial Number" of the USB device descriptor as part of the SMBIOS information without change. Then, the CPU 16 generates a UUID by using the MAC address of the network controller 14, sets the information 83 on the UUID (S34), and ends the auto-fill processing.

FIG. 7 is a flowchart illustrating first response processing. The first response processing is the processing to be performed in accordance with an inquiry request from the external apparatus 100 after the BIOS processing illustrated in FIG. 3 and FIG. 4 has been performed. Here, an "inquiry request" means a transmission request for the identification information corresponding to the printer 20. When the CPU 16 receives an inquiry request for the printer 20 from the external apparatus 100 via the network NW (S41: Yes), the CPU 16 reads the SMBIOS information from the first flash memory 15 by using the SMBIOS program and obtains the identification information (S42). That is to say, the CPU 16 obtains the information 81 on the product name and the information 82 on the serial number, set by the auto-fill processing, as the identification information.

Also, the CPU 16 converts the obtained identification information into a usable format of SNMP by using the SNMP agent program and generates the converted identification information (S43). The CPU 16 adds a header and a footer to the converted identification information to generate first response information (S44) and transmits the generated first response information to the external apparatus 100 (S45). The external apparatus 100 receives the first response information and obtains the identification information corresponding to the printer 20 to enable the external apparatus 100 to control the printer 20.

Figure 8:
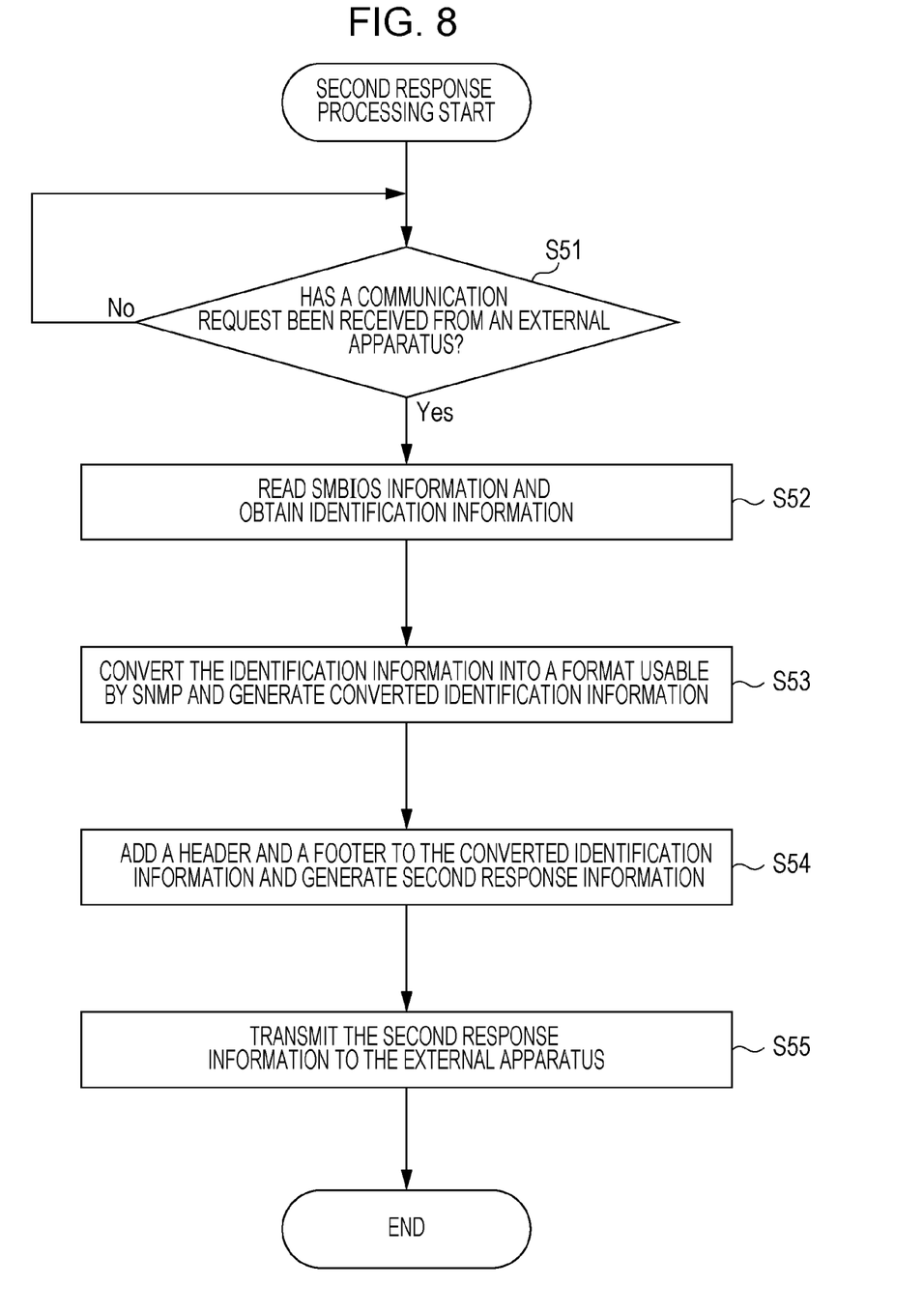
FIG. 8 is a flowchart illustrating second response processing.

FIG. 8 is a flowchart illustrating second response processing. The second response processing is processing performed in accordance with a communication request from the external apparatus 100 after the first response processing illustrated in FIG. 7. When the CPU 16 receives a communication request for the printer 20 from the external apparatus 100 via the network NW (S51: Yes), the CPU 16 reads the SMBIOS information from the first flash memory 15 by using the SMBIOS program to obtain the identification information (S52). Also, the CPU 16 converts the obtained identification information into a usable format of SNMP by using the SNMP agent program to generate converted identification information (S53). The CPU 16 adds a header and a footer to the converted identification information to generate second response information (S54) and transmits the generated second response information to the external apparatus 100 (S55).

As described above, with the present embodiment, it is possible for the external apparatus 100 to control, via the network NW, the printer 20, which does not support network communication and which is integrally contained in the information processing apparatus 1. This is because the CPU board 10 generates identification information corresponding to the printer 20 based on the USB device descriptor obtained from the printer 20, and thus it is possible for the CPU board 10 to obtain the identification information without requesting user intervention.

Also, the identification information is stored in the first flash memory 15 in which the BIOS setting values are stored, and thus even if the OS of the information processing apparatus 1 is changed, it is not necessary to change the identification information. In contrast, if the identification information is stored on the HDD 60, when the HDD 60 is removed, it is necessary to obtain the identification information once again. However, since the identification information is stored in the first flash memory 15, there is no such problem.

Also, because the identification information is stored in the first flash memory 15, even if the printer 20 is not coupled to the CPU board 10, it is possible to respond to the external apparatus 100. Also, at the time of responding to the external apparatus 100, the SMBIOS information is read using the SMBIOS program, and communication based on SNMP is performed using the SNMP agent program. It is therefore possible to realize the present embodiment by using a general purpose program.

Also, when the CPU board 10 determines that the identification information is not stored in the first flash memory 15 (when determined as Yes in S03 in FIG. 3), the CPU board 10 performs the auto-fill processing to generate identification information. Accordingly, it is possible for the CPU board 10 to obtain the identification information at the first start time of the CPU board 10 and when the user intentionally deletes the identification information in the BIOS menu M. Also, when the CPU board 10 determines that the identification information is stored in the first flash memory 15, the CPU board 10 does not perform the auto-fill processing, and thus the identification information will not be mistakenly changed.

It is possible to employ the following variations in addition to the embodiments.

First Variation

In the embodiments described above, the identification information generated by the CPU board 10 is stored in the first flash memory 15 as part of the SMBIOS information. However, the information other than the SMBIOS information may be stored as the identification information. For example, the MIB (Management Information Base) information of SNMP may be stored as the identification information. In this case, information produced by concatenating the information 87 on the product suffix to the "iProduct" of the USB device descriptor may be stored as sysDescr (entity information) of the MIB information, and the "iSerial Number" may be stored as a chassisID (identifier of an apparatus) of the MIB information. Also, the identification information may be stored in a memory other than the first flash memory 15, for example, the HDD 60, or the like. Also, the memory that stores the identification information may not necessarily be included in the information processing apparatus 1 and may be included in an apparatus with which the CPU board 10 is capable of communicating.

Second Variation

In the embodiments described above, as the "communication program for realizing communication based on a predetermined communication protocol", the SMBIOS program and the SNMP agent program are exemplified. However, it is not necessary to use both of the programs. For example, a predetermined application program that runs on the OS that is stored in the HDD 60 may read and write the SMBIOS information. Also, the communication between the CPU board 10 and the external apparatus 100 may be performed by using a communication protocol other than SNMP.

Third Variation

Also, in the embodiments described above, the CPU 16 reads the identification information from the storage area in which the SMBIOS information is stored based on the SNMP agent program. However, the identification information may be obtained by another method. For example, the CPU 16 may access a predetermined storage area in the first flash memory 15, may obtain a USB device descriptor, may generate identification information based on the obtained USB device descriptor, and may obtain the generated identification information. That is to say, when the CPU 16 receives an inquiry request or a communication request from the external apparatus 100, the CPU 16 may generate identification information using a USB device descriptor in a predetermined storage area, which becomes primary information, or may read the SMBIOS information, which becomes secondary information.

Fourth Variation

In the embodiment described above, the information 81 on the product name, which is produced by concatenating the information 87 on the product suffix to the "iProduct" of the USB device descriptor and the information 82 on the serial number based on the "iSerial Number" are used as identification information. However, the generation algorithm of identification information is not limited to this. For example, information produced by concatenating the information 87 on the product suffix and the "iSerial Number" to the "iProduct" or the "iManufacturer" may be used for the information 81 on the product name. In this manner, identification information may be generated based on a predetermined generation algorithm by using each piece of information of the USB device descriptor.

Fifth Variation

Also, in the embodiment described above, identification information is generated by using the BIOS. However, identification information may be generated by using an application program, such as a device driver that controls the printer 20, or the like. In this case, the application program is stored in the HDD 60.

Sixth Variation

In the embodiment described above, the example is illustrated of the case in which the CPU board 10 and the printer 20 perform communication based on the USB communication standard. However, the communication may be performed based on another communication standard. For example, the CPU board 10 and the printer 20 may perform communication based on a serial communication standard, such as RS-232, or the like.

Seventh Variation

In the embodiment described above, the printer 20 is exemplified as the "internal equipment". However, the other equipment may be used instead of the printer 20. For example, when the information processing apparatus 1 is a POS terminal, a scanner, a display, a keyboard, a cash drawer, or the like may be used as the "internal equipment". Also, a plurality of pieces of equipment may be coupled to one CPU board 10.

Eighth Variation

In the embodiment described above, the CPU board 10 is exemplified as the "control equipment". However, the other equipment may be used instead of the CPU board 10. For example, various integrated circuits or an interface board may be used as the "control equipment".

Ninth Variation

In the embodiment described above, when the CPU 16 determines that identification information is not stored in the first flash memory 15, identification information is generated by performing the auto-fill processing. However, identification information may be disabled from rewriting after the first starting of the CPU board 10.

The Other Variations

The scope of the disclosure right includes a method of performing each processing by the information processing apparatus 1, which is described in each of the embodiments described above and each of the variations, a program for executing each processing of the information processing apparatus 1, and a computer-readable recording medium recording the program. Also, it is possible to employ a configuration by combining each of the embodiments and each of the variations. In addition, various changes may be made, for example, each processing of the information processing apparatus 1 is realized by a combination of hardware and software, or the like without departing from the spirit and scope of the disclosure.

Hereinafter a description will be given of the information processing apparatus 1 and a control method of the information processing apparatus 1. The information processing apparatus 1 includes: control equipment 10 configured to communicate with an external apparatus 100 via a network NW and including a controller 16; and internal equipment 20 configured to communicate with the control equipment 10 by a communication method different from the network NW and having equipment information, wherein the controller 16 obtains the equipment information from the internal equipment 20 and generates identification information corresponding to the internal equipment 20 based on the obtained equipment information, and when the controller 16 receives an inquiry request to the internal equipment 20 from the external apparatus 100 via the network NW, the controller 16 transmits first response information indicating the generated identification information to the external apparatus 100.

A method of controlling an information processing apparatus 1 is a method of controlling an information processing apparatus 1 including control equipment 10 configured to communicate with an external apparatus 100 via a network NW and including a controller 16; and internal equipment 20 configured to communicate with the control equipment 10 without using the network NW and having equipment information, the method including: obtaining the equipment information from the internal equipment 20 and generating identification information corresponding to the internal equipment 20 based on the obtained equipment information, and when receiving an inquiry request for the internal equipment 20 from the external apparatus 100 via the network NW, transmitting first response information indicating the generated identification information to the external apparatus 100.

With this configuration, when the external apparatus 100 controls the internal equipment 20 that does not support network communication via the network NW, the control equipment 10 generates identification information corresponding to the internal equipment 20 based on the equipment information obtained from the internal equipment 20. Accordingly, it is possible for the control equipment 10 to obtain identification information without user's intervention and to simply control the control internal equipment 20 from the external apparatus 100 via the network NW.

In the information processing apparatus 1 described above, the control equipment 10 may include a first memory 15 for storing a BIOS setting value, and the controller 16 may store the generated identification information in the first memory 15.

With this configuration, the identification information is stored in the first memory 15 in which a BIOS setting value is stored, and thus when the OS of the information processing apparatus 1 is changed, it is not necessary to change the identification information. Also, if the identification information is stored in a removable memory, such as an HDD 60, or the like, when the memory is removed, it is necessary to obtain the identification information once again. However, when the identification information is stored in the first memory 15 in which a setting value of BIOS is stored, there is no such problem. Also, since the identification information is stored in the control equipment 10, even if the internal equipment 20 is not coupled, it is possible to respond to the external apparatus 100.

The information processing apparatus 1 described above may further include a second memory 60 different from the first memory 15, wherein the controller 16 may read a communication program for realizing communication based on a predetermined communication protocol from the second memory 60 and may execute the communication program, when the controller 16 receives a communication request for the internal equipment 20 from the external apparatus 100 via the network NW, the controller may convert the identification information stored in the first memory 15 into second response information in a format usable by the predetermined communication protocol, and may transmit the second response information to the external apparatus 100.

With this configuration, it is possible to easily perform protocol conversion and communication with the external apparatus 100 using a communication program stored in the second memory 60 different from the first memory 15 in which a setting value of BIOS is stored. Thereby, a communication program to be used is not limited to the program that is possible to be stored in the first memory 15.

In the information processing apparatus 1 described above, the communication method used between the control equipment 10 and the internal equipment 20 may correspond to a USB communication standard, the internal equipment 20 may be USB equipment, the equipment information may be a USB device descriptor, and the communication program may include at least one of an SMBIOS program and an SNMP agent program.

With this configuration, it is possible for the external apparatus 100 to control, via the network NW, USB equipment that does not support network communication. Also, it is possible for the control equipment 10 to simply transmit the second response information to the external apparatus 100 using at least one of the SMBIOS program and the SNMP agent program.

In the information processing apparatus 1 described above, at least at an initial start time of the control equipment 10 the controller 16 may generate the identification information.

With this configuration, it is possible for the control equipment 10 to simply obtain identification information at least at an initial start time of the control equipment 10.

In the information processing apparatus 1 described above, the controller 16 may determine whether or not the identification information is stored in the first memory 15 at a start time of the control equipment 10, and when the controller 16 determines that the identification information is not stored in the first memory 15, the controller 16 may generate the identification information, whereas when the controller 16 determines that the identification information is stored in the first memory 15, the controller 16 may not generate the equipment information.

With this configuration, when the controller 16 determines that identification information is not stored in the first memory 15, the controller 16 generates identification information. Accordingly, at an initial start time and when the user intentionally deletes identification information, it is possible for the control equipment 10 to obtain identification information. Also, when the controller 16 determines that identification information is stored in the first memory 15, the controller 16 does not generate identification information, and thus identification information is not changed mistakenly.

In the information processing apparatus 1 described above, the internal equipment 20 may include a printing mechanism 22.

With this configuration, it is possible to adapt the information processing apparatus 1, which is an image forming apparatus that integrally includes the printer 20 that does not support connection to the network NW as the internal equipment 20. It is possible for the external apparatus 100 to transmit print data to the information processing apparatus 1 via the network NW and to form an image on a print medium.

What is claimed is:

1. An information processing apparatus comprising:
   control equipment including a network port configured to communicate with an external apparatus via a network, a first USB port, and a controller; and
   internal equipment including:
      a second USB port configured to communicate with the control equipment by a USB connection with the first USB port,
      a printing mechanism configured to print based on print command, and
      a memory configured to store equipment information, the equipment information including a product name information, wherein
   the controller is configured to convert print data in markup language format into the print command when the controller receives the print data in markup language format from the external apparatus,
   the controller obtains the equipment information from the internal equipment and generates identification information corresponding to the internal equipment based on the equipment information by adding suffix information into the product name information,
   when the controller receives an inquiry request for the internal equipment from the external apparatus via the network, the controller:
      converts the identification information to a format usable by a predetermined communication protocol,
      generates first response information based on the converted identification information, and
      transmits the first response information indicating the generated identification information to the external apparatus by the predetermined communication protocol.

2. The information processing apparatus according to claim 1, wherein
   the control equipment includes a first memory that stores a BIOS setting value, and
   the controller stores the generated identification information in the first memory.

3. The information processing apparatus according to claim 2, further comprising a second memory that stores a communication program for realizing communication based on Simple Network Management Protocol (SNMP) that is different from the first memory, wherein
   the controller reads the communication program from the second memory and executes the communication program, and
   when the controller receives a communication request for the internal equipment from the external apparatus via the network, the controller converts the identification information stored in the first memory into second response information in a format usable by SNMP and transmits the second response information to the external apparatus.

4. The information processing apparatus according to claim 3, wherein
   the internal equipment is USB equipment,
   the equipment information is a USB device descriptor, and
   the communication program includes at least one of an SMBIOS program and an SNMP agent program.

5. The information processing apparatus according to claim 1, wherein
   at least at an initial start time of the control equipment the controller generates the identification information.

6. The information processing apparatus according to claim 2, wherein
   the controller determines whether or not the identification information is stored in the first memory at a start time of the control equipment, and when the controller determines that the identification information is not stored in the first memory, the controller generates the identification information, whereas when the controller determines that the identification information is stored in the first memory, the controller does not generate the equipment information.

7. A method of controlling an information processing apparatus including control equipment including a network port configured to communicate with an external apparatus via a network, a first USB port, and internal equipment including a second USB port configured to communicate with the control equipment by a USB connection with the first USB port, a printing mechanism configured to print based on print command, and a memory configured to store equipment information, the equipment information including a product name information, the method comprising:
   determining whether or not the control equipment obtains the equipment information,
   when it is determined that the control equipment obtains the equipment information, generating identification information corresponding to the internal equipment based on the equipment information by adding suffix information into the product name information,
   when receiving an inquiry request for the internal equipment from the external apparatus via the network,
      converting the identification information to a format usable by a predetermined communication protocol,
      generating first response information based on the converted identification information, and
      transmitting the first response information indicating the generated identification information to the external apparatus, and
   when receiving print data in markup language format from the external apparatus, converting the print data in markup language format into the print command.

8. The method of controlling an information processing apparatus, according to claim 7, further comprising:
   storing a BIOS setting value in a first memory included in the control equipment, and
   storing the generated identification information in the first memory.

9. The method of controlling an information processing apparatus, according to claim 8, further comprising:
   storing a communication program for realizing communication based on Simple Network Management Protocol (SNMP) in a second memory different from the first memory, reading the communication program from the second memory and executing the communication program, and when receiving a communication request for the internal equipment from the external apparatus via the network, converting the identification information stored in the first memory into second response information in a format usable by SNMP, and transmitting the second response information to the external apparatus.

10. The method of controlling an information processing apparatus, according to claim 9, wherein the internal equipment is USB equipment, the equipment information is a USB device descriptor, and the communication program includes at least one of an SMBIOS program and an SNMP agent program.

11. The method of controlling an information processing apparatus, according to claim 7, wherein the generating generates the identification information at an initial start time of the control equipment.

12. The method of controlling an information processing apparatus, according to claim 8, further comprising:

determining whether or not the identification information is stored in the first memory at a start time of the control equipment, and when determined that the identification information is not stored in the first memory, generating the identification information, whereas when determined that the identification information is stored in the first memory, not generating the equipment information.

\* \* \* \* \*